US009458336B2

(12) United States Patent
Murakami

(10) Patent No.: US 9,458,336 B2
(45) Date of Patent: Oct. 4, 2016

(54) INK COMPOSITION

(71) Applicant: SAKURA COLOR PRODUCTS CORPORATION, Osaka-shi (JP)

(72) Inventor: Mari Murakami, Osaka (JP)

(73) Assignee: SAKURA COLOR PRODUCTS CORPORATION, Osaka (JP)

(*) Notice: Subject to any disclaimer, the term of this patent is extended or adjusted under 35 U.S.C. 154(b) by 0 days.

(21) Appl. No.: 14/647,442

(22) PCT Filed: Nov. 26, 2013

(86) PCT No.: PCT/JP2013/081706
§ 371 (c)(1),
(2) Date: May 26, 2015

(87) PCT Pub. No.: WO2014/084189
PCT Pub. Date: Jun. 5, 2014

(65) Prior Publication Data
US 2015/0307725 A1 Oct. 29, 2015

(30) Foreign Application Priority Data

Nov. 27, 2012 (JP) ................................. 2012-259145

(51) Int. Cl.
C09D 11/102 (2014.01)
C09D 11/16 (2014.01)
C09D 11/17 (2014.01)
C09D 11/20 (2006.01)
C09D 133/02 (2006.01)
C09D 133/14 (2006.01)

(52) U.S. Cl.
CPC ............. C09D 11/17 (2013.01); C09D 11/102 (2013.01); C09D 11/16 (2013.01); C09D 11/20 (2013.01); C09D 133/02 (2013.01); C09D 133/14 (2013.01)

(58) Field of Classification Search
None
See application file for complete search history.

(56) References Cited

U.S. PATENT DOCUMENTS

| 5,747,146 A * | 5/1998 | Kashiwazaki ....... B41M 5/5245 428/195.1 |
| 5,955,515 A * | 9/1999 | Kimura ................ B41J 2/04528 106/31.13 |
| 6,416,853 B1 * | 7/2002 | Nakashima ............. A63H 33/22 428/29 |
| 2001/0036552 A1 * | 11/2001 | Otani ..................... B41M 5/502 428/411.1 |
| 2004/0192808 A1 * | 9/2004 | Ohno ...................... C09D 11/18 523/161 |
| 2005/0158488 A1 * | 7/2005 | Oiwamoto ........... B41M 5/5218 428/32.37 |
| 2006/0062902 A1 * | 3/2006 | Sager .................... B22F 1/0018 427/74 |
| 2007/0106962 A1 * | 5/2007 | Sakakibara .............. H04N 1/58 716/100 |
| 2007/0197685 A1 * | 8/2007 | Aruga .................. C09D 11/322 523/160 |
| 2007/0203259 A1 | 8/2007 | Kurihara et al. |
| 2008/0090963 A1 * | 4/2008 | Rajaraman ............. C08G 77/46 525/100 |
| 2008/0090964 A1 * | 4/2008 | Rajaraman ............... C09D 7/06 525/100 |
| 2009/0080002 A1 * | 3/2009 | Nakano .................... B41J 2/205 358/1.7 |
| 2009/0114121 A1 * | 5/2009 | Morohoshi ............ C09D 11/40 106/31.86 |
| 2009/0130312 A1 * | 5/2009 | Ono ....................... B41M 5/506 427/288 |
| 2012/0055361 A1 * | 3/2012 | Takemoto ............. B41C 1/1066 101/401.1 |
| 2015/0307725 A1 * | 10/2015 | Murakami ............. C09D 11/16 523/122 |

FOREIGN PATENT DOCUMENTS

| CN | 1993435 A | 7/2007 |
| CN | 101851445 A | 10/2010 |
| JP | 2135268 A | 5/1990 |
| JP | 9157576 A | 6/1997 |
| JP | 1143634 A | 2/1999 |
| JP | 2000109739 A | 4/2000 |
| JP | 2001191026 A * | 7/2001 |
| JP | 2004010659 A | 1/2004 |
| JP | 20081832 A | 1/2008 |
| JP | 2012052057 A | 3/2012 |
| WO | 2012133134 A1 | 10/2012 |

OTHER PUBLICATIONS

International Search Report (ISR) mailed Dec. 24, 2013, issued for International Application No. PCT/JP2013/081706.
An Office Action issued by the State Intellectual Property Office of China, mailed Mar. 24, 2016, for Chinese counterpart application No. 201380061775.3.

* cited by examiner

Primary Examiner — Peter A Salamon
(74) Attorney, Agent, or Firm — Law Office of Katsuhiro Arai

(57) ABSTRACT

A water-based ink composition for glass and ceramic surfaces contains an acrylic silicone resin emulsion, pigment, dispersant, and water-based solvent. The water-based ink composition may further contain a thixotropic agent and/or resin beads. The ink composition allows writing made with it to sufficiently demonstrate excellent water resistance, hot water resistance, and scratch resistance even on glass and ceramic surfaces, and to remain sufficiently legible even after the glass products or ceramics are cleaned repeatedly.

2 Claims, No Drawings

INK COMPOSITION

This application is the U.S. National Phase under 35 U.S.C. §371 of International Application PCT/JP2013/081706, filed Nov. 26, 2013, which claims priority to Japanese Patent Application No. 2012-259145, filed Nov. 27, 2012. The International Application was published under PCT Article 21(2) in a language other than English.

TECHNICAL FIELD

The present invention relates to an ink composition that can be used to write on glass and ceramic surfaces.

BACKGROUND ART

Inks that can be used to write on glass surfaces are known, examples of which include, besides so-called oil-based inks: inks containing glycol ether or other organic solvent, pigment, 25° C. water, as well as resin whose solubility in ethanol is 7% or less such as vinyl chloride/vinyl acetate copolymer, ester acrylate polymer, or other acrylic resin as described in Patent Literature 1; glass marking inks for showing the presence of glass containing colorant, at least one type of styrene/ester (meth)acrylate copolymer emulsions, ester (meth)acrylate/vinyl acetate copolymer emulsions, ester (meth)acrylate/vinylidene chloride copolymer emulsions, and other resin emulsions and alkali-soluble resins, as well as water-soluble resin, thixotropic agent, and water as described in Patent Literature 2; and water-based pigment inks for glass containing pigment, ester poly(meth)acrylate, or other resin emulsion as described in Patent Literature 3.

Furthermore, Patent Literature 4 describes a water-based ink composition for writing instruments that can be used to write not on glass surfaces, but on non-penetrated surfaces, characterized in that such composition contains at least pigment, water, and polycarbonate/polyol copolymer urethane emulsion.

These water-based inks can certainly be used to write on glass and ceramic surfaces, but due to the hydrophilicity of glass and ceramic surfaces, the water in such water-based ink, which serves as the medium, tends to exist between such hydropholic surface and the organic resin or colorant of water-based ink. This prevents writing from being fixed on glass or ceramic surfaces sufficiently, meaning that these inks, lacking in water resistance, hot water resistance, and scratch resistance, cannot be set on glass and ceramic surfaces.

Accordingly, when glass products, etc., bearing writing made with such water-based inks are washed, such writing is washed off.

PRIOR ART LITERATURES

Patent Literatures

Patent Literature 1: Japanese Patent Laid-open No. Hei 11-43634
Patent Literature 2: Japanese Patent Laid-open No. Hei 9-157576
Patent Literature 3: Japanese Patent Laid-open No. Hei 2-135268
Patent Literature 4: Japanese Patent Laid-open No. 2008-1832

SUMMARY OF THE INVENTION

Problems to Be Solved by the Invention

The object of the present invention is to provide an ink that allows writing made with the ink to sufficiently demonstrate excellent water resistance, hot water resistance, and scratch resistance even on glass and ceramic surfaces and remain sufficiently legible even after the glass products or ceramics are washed repeatedly.

Means for Solving the Problems

The present invention was made to achieve the aforementioned object, and has the following constitutions:
1. Water-based ink composition for glass and ceramic surfaces, containing acrylic silicone resin emulsion, pigment, dispersant, and water-based solvent.
2. Water-based ink composition for glass and ceramic surfaces according to 1, further containing a thixotropic agent and/or resin beads.

Effects of the Invention

According to the present invention, writing on glass and ceramic surfaces will sufficiently demonstrate excellent water resistance, hot water resistance, and scratch resistance even on glass and ceramic surfaces. Additionally, an ink composition can be obtained which may be made glossy or matte by selecting an appropriate pigment, etc., to be used.

MODE FOR CARRYING OUT THE INVENTION

Each component of the ink composition proposed by the present invention is explained below.

Acrylic Silicone Resin Emulsion

Acrylic silicone resin refers to a comb-structured polymer constituted by a main chain of acrylic polymer or oligomer grafted with a side chain of polysiloxane oligomer of silicone structure. Furthermore, the main chain of the acrylic resin may contain styrene or other copolymer component, for example. In the present invention, acrylic silicone resin emulsion made by emulsifying acrylic silicone resin using surface active agent, etc., is used.

For this acrylic silicone resin emulsion, Primal PR-29, Polysol AP3900, AE980, AE982, etc., can be used, for example, or any other acrylic silicone resin emulsion can be used that contains solid content of resin to the extent that the stability of emulsion is not affected, such as one containing solid content of resin by 20 to 60 percent by weight or preferably 30 to 50 percent by weight.

The effects of the present invention can be demonstrated so long as any acrylic silicone resin as described above is used, but resin whose MFT is 30° C. or below is more preferred from the viewpoint of achieving greater scratch resistance. Resin whose MFT is 15° C. or below is even more preferred.

Also, the amount of acrylic silicone resin emulsion used in the present invention is such that the resin can be blended in to achieve a concentration of solid content of 2 to 45 percent by weight, or preferably 4 to 45 percent by weight, or more preferably 7 to 45 percent by weight, or even more preferably 7 to 40 percent by weight, or most preferably 10 to 30 percent by weight, relative to the water-based ink composition proposed by the present invention. As a result, hot water resistance and scratch resistance can be given to writing made with the ink composition.

When the solid content of acrylic silicone resin emulsion exceeds 45 percent by weight relative to the ink composition, a higher viscosity of the ink composition will prevent the ink from flowing out of the writing instrument smoothly; when the solid content is less than 2 percent by weight, on the other hand, writing with the ink composition will have lower hot water resistance and scratch resistance on the base material.

(Pigment)

Pigment is a component that can be blended into the ink composition proposed by the present invention to the extent that writing made with the ink composition will have the intended color and demonstrate water resistance, hot water resistance, scratch resistance, and other properties.

Any pigment can be used so long as the aforementioned purpose is achieved.

For example, any known organic pigment or dye can be adopted, such as phthalocyanine, azo, quinacridone, anthraquinone, dioxane, indigo, thioindigo, perinone, perilene, indolinone, or azo-azo methine pigment or dye.

As for inorganic pigments, titanium dioxide, carbon black, alumina silica, talc, aluminum powder, bronze powder, or other metal powder pigment; fluorescent pigment; pearly pigment; photoluminescent pigment, etc., can be used.

The content of such pigment in the ink composition proposed by the present invention is 0.5 to 35 percent by weight, or preferably 1.0 to 30 percent by weight. When the content exceeds 35 percent by weight, a higher viscosity of the ink composition will prevent the ink from flowing out of the writing instrument smoothly; when the content is less than 0.5 percent by weight, on the other hand, the ink composition will not have sufficient color, resulting in poor color development property and covering property.

In addition, various dyes can be blended, as necessary, to achieve the intended color.

The ink composition proposed by the present invention may contain additional components other than the above, as necessary. To be specific, lubricant, wetting agent, rust-preventive agent, anti-corrosive agent, anti-fungal agent, defoaming agent, leveling agent, agglutination inhibitor, pH-adjusting agent, water-soluble organic solvent, surface active agent, etc., can be added.

(Dispersant)

In the present invention, dispersant offering excellent solubility in water is blended into the ink composition to stabilize the dispersion of pigment contained in the ink.

For example, any known dispersant can be used, such as one or more types selected from styrene acrylic resins, styrene resins, and acrylic resins, etc. For this dispersant, Joncryl J-62, Joncryl HPD-96, Joncryl 70 (BASF Japan), etc., can be used, for example.

The content of dispersant in the ink composition proposed by the present invention is 0.1 to 20 percent by weight, or preferably 0.5 to 15 percent by weight, relative to all ink composition, and an appropriate content can also be determined according to the amount of pigment in the ink composition.

When the content of dispersant exceeds 20 percent by weight, the ink will not flow out of the writing instrument smoothly; when the content is less than 0.1 percent by weight, on the other hand, a lower dispersability of pigment will lead to poor viscosity and also cause writing made with the ink to have lower scratch resistance on the base material.

(Water-Based Solvent)

For the water-soluble solvent in the present invention, water, or mixed medium of water and water-soluble organic medium, can be used. Also, water-based medium derived from the aforementioned acrylic silicone resin emulsion is blended in the ink composition.

The present invention can use any known water-soluble organic medium, where the water-soluble organic solvent can be used as an anti-drying agent or wetting agent for the ink. The water-soluble organic solvent is not limited in any way, but examples include ethylene glycol, diethylene glycol, propylene glycol and other glycols, ethylene glycol monomethyl ether and other glycol ethers, diethylene glycol monomethyl ether and other carbitols, glycerin, trimethylol propane, etc. One type of water-soluble organic solvent may be used alone, or two or more types may be combined. By using such water-soluble organic solvent, drying of the tip of the writing instrument such as pen can be prevented.

The amount of all water-soluble solvent used in the ink composition proposed by the present invention, including the medium derived from the aforementioned acrylic silicone resin emulsion, etc., is 1 to 90 percent by weight, or preferably 5 to 85 percent by weight, relative to all ink composition.

When the blended content of water-soluble solvent exceeds 90 percent by weight in the present invention, the viscosity of the ink composition will become too low, making controlling the ink composition flowing out of the writing instrument difficult, while making writing made with the ink too light and more vulnerable to scratching. On the other hand, failure to blend sufficient water-based medium despite the need to do so will make the viscosity of the ink composition too high and prevent the ink from flowing out of the writing instrument smoothly.

(Thixotropic Agent)

The ink composition proposed by the present invention can contain a water-soluble thixotropic agent. By adding a thixotropic agent, thixotropic property can be added to the ink composition to prevent the ink composition from producing hard cakes while in storage or inside the ink reservoir in a writing instrument.

For this thixotropic agent, any known substance can be used; for example, ammonium polyacrylate or acrylate emulsion can be adopted. To be specific, Mowiplas XW330, Primal ASE-60 or Primal TT-935 can be used.

The amount of thixotropic agent used, which can be determined as desired by considering the adjustment of viscosity of the ink composition and the intended level of thixotropy, is 0.5 to 5 percent by weight, or preferably 1.0 to 3.0 percent by weight, relative to all ink composition.

When the content of the thixotropic agent exceeds 5 percent by weight, a higher viscosity of the ink composition will prevent the ink from flowing out of the writing instrument smoothly; when insufficient thixotropic agent is used, on the other hand, the viscosity will drop and thixotropy will become insufficient.

(Resin Beads)

In the present invention, the ink composition may contain resin beads. The resin beads can be used to reduce the average specific gravity of solid contents in the ink and improve the covering property. The resin beads are not limited in shape in any way, and may be spherical, amorphous, hollow, flat, or the like. They are made of polyethylene, polypropylene, vinyl chloride, polymethacrylate, benzoguanamine, nylon, or other material, or material colored with dyes or the like. Resin beads that can be used in the present invention include MP-1000 (polymethyl methacrylate, manufactured by Soken Chemical & Engineering Co., Ltd.), Epostar S (melamine/formaldehyde condensation product, manufactured by Nippon Shokubai Kagaku Kogyo Co., Ltd.), Nylon SP (nylon, manufactured by Toray Industries, Inc.), Zeon 121 (vinyl chloride, manufactured by Zeon Corporation), MHSO55 (solid content 30%) (manufactured by Zeon Corporation), SX863 (A) (solid content 20%), SX864 (B) (solid content 40%), SX865 (B) (solid content 48%) (all manufactured by JSR Corporation), Ropaque OP-62 (solid content 42.5%), Ropaque OP-84J (solid content 37.5%), Ropaque OP-91 (solid content 27.5%), Ropaque Ultra (all manufactured by Rohm and Haas Japan Co., Ltd.), Muticle PP120, Muticle PP240D (manufactured by Mitsui Toatsu Chemicals, Inc.), Voncoat PP-2000S, Voncoat PP-1000, Voncoat PP-1001, Voncoat PP-1100 (manufactured by Dainippon Ink and Chemicals, Inc.), and the like.

(Other Additives)

Other additives may be added to the water-based ink composition proposed by the present invention, as necessary. Other additives are not limited in any way, but additives that are used commonly include rust-preventive agents such as benzotriazole, tolyltriazole, disyclohexyl ammonium nitrate, and the like, anti-corrosive/anti-fungal agents such as benzoisothiazolin anti-corrosive/anti-fungal agent, pentachlorophenol anti-corrosive/anti-fungal agent, cresol anti-corrosive/anti-fungal agent, propylene glycol anti-corrosive/anti-fungal agent, iodine anti-corrosive/anti-fungal agent, and the like, surface active agents such as alkyl sulfosuccinic acid type and the like, wetting agents, defoaming agents, leveling agents, agglutination inhibitors, pH adjusting agents, and the like.

(Purpose of Use of Ink Composition)

The ink composition proposed by the present invention can be used for various writing instruments.

For example, it can be filled in the ink reservoir of a marker, pen, etc., to write on glass, ceramic, and other surfaces using the tip.

Glass and ceramics to write on may be so-called tableware. Such tableware can all be written on with general oil-based ink compositions, but writing on tableware with the ink composition proposed by the present invention will not fade even after repeated washing and use. In particular, the ink composition demonstrates excellent hot water resistance, which makes the ink also usable on tableware washed in dishwashers.

Examples of the present invention are shown below, but it should be noted that the present invention is not at all limited to these examples.

Example

Method of Manufacturing the Ink Composition Proposed by the Present Invention a. Mix/agitate a water-based medium and dispersant to obtain dispersant solution. Note that propylene glycol was further mixed into Examples 6 to 13.

b. Add pigment to the dispersant solution obtained in a, and then agitate the mixture using a bead mill to obtain pigment-dispersed liquid.

c. Add a thixotropic agent to a water-soluble medium placed in a different container and agitate the mixture to obtain a thixotropic agent solution.

d. Add the pigment-dispersed liquid obtained in b to the thixotropic agent solution obtained in c, and further add lubricant and an anti-corrosive agent.

e. Add a resin emulsion to the composition obtained in d, and then agitate the mixture to manufacture an ink composition conforming to the present invention.

Each ink composition obtained according to the aforementioned manufacturing method was used to make a writing instrument as described below.

The aforementioned ink composition was filled in the ink storage part of a pen containing an agitator, after which the pen was capped with a valve and then connected to a marker pen tip formed by a fiber bundle.

In Example 1, Primal PR-29 was blended as acrylic silicone resin emulsion to 20 percent by weight relative to all ink composition. The resulting solid content of acrylic silicone resin in the ink was 8.6 percent by weight.

In Example 2, the amount of acrylic silicone resin emulsion used in Example 1 was increased to 70 percent by weight.

In Examples 3 to 5, ink compositions were obtained in the same manner as with the ink composition in Example 1, except that Polysol AP-3900, AE980, and AE982 were respectively used instead of Primal PR-29.

Also, Examples 6 to 14 represent examples of ink compositions not containing resin beads, each using different amounts of acrylic silicone emulsion, or ester acrylate resin emulsion, thixotropic agent, etc.

On the other hand, Comparative Examples 1 to 7 represent examples that are identical to the ink composition in Example 1, except that ester acrylate resin emulsion or styrene acrylate resin emulsion was adopted instead of using acrylic silicone resin emulsion.

(Evaluation)

<Water Resistance, Hot Water Resistance>

A straight line was drawn free-hand on a sheet of glass and let dry for 24 hours, after which one half of the straight line was soaked in ion-exchange water of room temperature (water resistance) or ion-exchange water of 50° C. in temperature (hot water resistance), followed by visual inspection of the condition of peeling one week later. The percentage of the area of the remaining line as obtained when the condition of peeling was visually checked to 100% representing the area of the straight line prior to evaluation was obtained.

<Scratch Resistance>

A straight line was drawn free-hand on a sheet of glass and let dry for 24 hours, after which the straight line was scratched by applying 1 $kg/cm^2$ of load using cotton in an ambience of 20±2° C. in temperature and 65±5% in humidity.

The resulting condition of peeling of the scratched part of the straight line was visually checked. The percentage of the area of the remaining line as obtained when the condition of peeling was visually checked to 100% representing the area of the straight line prior to evaluation was obtained.

The results are shown in Table 1 below.

TABLE 1

| | | (A) | | | | | | | | | | |
|---|---|---|---|---|---|---|---|---|---|---|---|---|
| | | Examples | | | | | | | | | | |
| | Composition | 1 | 2 | 3 | 4 | 5 | 6 | 7 | 8 | 9 | 10 | 11 |
| Titanium oxide | Pigment | 22.0 | 11.0 | 22.0 | 22.0 | 22.0 | | | | | | |
| Irgazin Red D3656HD | | | | | | | 1.4 | 1.4 | 1.4 | 1.4 | 1.4 | 1.4 |
| Monarch 800 | | | | | | | | | | | | |

TABLE 1-continued (A continued)

| Composition | | 1 | 2 | 3 | 4 | 5 | 6 | 7 | 8 | 9 | 10 | 11 |
|---|---|---|---|---|---|---|---|---|---|---|---|---|
| Joncryl J-62 | Dispersant | 10.8 | 5.4 | 10.8 | 10.8 | 10.8 | 0.8 | 0.8 | 0.8 | 0.8 | 0.8 | 0.8 |
| Joncryl HPD-96 | | | | | | | | | | | | |
| Joncryl 70 | | | | | | | | | | | | |
| Water | Medium | 32.9 | 5.5 | 32.9 | 32.9 | 32.9 | 84.1 | 69.1 | 69.1 | 69.1 | 69.1 | 69.1 |
| Primal PR-29 | Acrylic silicone resin emulsion | 20.0 | 70.0 | | | | 5.0 | 20.0 | 5.0 | 10.0 | 15.0 | 50.0 |
| Polysol AP-3900 | | | | 20.0 | | | | | | | | |
| AE980 | | | | | 20.0 | | | | | | | |
| AE982 | | | | | | 20.0 | | | | | | |
| Voncoat AB-901 | Ester acrylate resin emulsion | | | | | | | | | | | |
| Primal SF-021 | | | | | | | | | | | | |
| Primal RHA-691 | | | | | | | | | | | | |
| Polysol AT741 | | | | | | | | | | | | |
| Polysol AP-3150 | Styrene acrylic resin emulsion | | | | | | | | | | | |
| Voncoat 3256 | Ester acrylate resin emulsion | | | | | | | | | 15.0 | 10.0 | 5.0 | |
| Nikasol A02K | | | | | | | | | | | | |
| Muticle PP240D | Resin beads | 4.0 | 1.0 | 4.0 | 4.0 | 4.0 | | | | | | |
| Ropaque Ultra | | 3.0 | 0.8 | 3.0 | 3.0 | 3.0 | | | | | | |
| MOWIPLAS XW330 | Thixotropic | 2.0 | | 2.0 | 2.0 | 2.0 | | | | | | |
| Primal ASE-60 | | | 1.0 | | | | | | | | | |
| Primal TT-935 | | | | | | | 3.0 | 3.0 | 3.0 | 3.0 | 3.0 | 3.0 |
| Neocol YSK | Surface active agent | 0.1 | 0.1 | 0.1 | 0.1 | 0.1 | 0.1 | 0.1 | 0.1 | 0.1 | 0.1 | 0.1 |
| Coatcide PH | Anti-corrosive/ anti-fungal agent | 0.1 | 0.1 | 0.1 | 0.1 | 0.1 | 0.1 | 0.1 | 0.1 | 0.1 | 0.1 | 0.1 |
| Proxel XL-2 | | 0.1 | 0.1 | 0.1 | 0.1 | 0.1 | 0.1 | 0.1 | 0.1 | 0.1 | 0.1 | 0.1 |
| Ethylene glycol | Lubricant | 5.0 | 5.0 | 5.0 | 5.0 | 5.0 | 5.0 | 5.0 | 5.0 | 5.0 | 5.0 | 5.0 |
| Propylene glycol | | | | | | | 0.4 | 0.4 | 0.4 | 0.4 | 0.4 | 0.4 |
| Total | | 100.0 | 100.0 | 100.0 | 100.0 | 100.0 | 100.0 | 100.0 | 100.0 | 100.0 | 100.0 | 100.0 |
| Effect | | | | | | | | | | | | |
| Water resistance (%) | | 100 | 100 | 60 | 100 | 100 | 100 | 100 | 100 | 100 | 100 | 100 |
| Hot water resistance (%) | | 100 | 100 | 60 | 100 | 100 | 100 | 100 | 100 | 100 | 100 | 100 |
| Scratch resistance (%) | | 100 | 100 | 100 | 80 | 100 | 70 | 100 | 70 | 80 | 90 | 100 |

(B)

| Composition | | Examples | | | Comparative Examples | | | | | | |
|---|---|---|---|---|---|---|---|---|---|---|---|
| | | 12 | 13 | 14 | 1 | 2 | 3 | 4 | 5 | 6 | 7 |
| Titanium oxide | Pigment | | | | 22.0 | 22.0 | 22.0 | 22.0 | 22.0 | 22.0 | 22.0 |
| Irgazin Red D3656HD | | 1.4 | 0.8 | | | | | | | | |
| Monarch 800 | | | | 0.9 | | | | | | | |
| Joncryl J-62 | Dispersant | 0.8 | 0.5 | 10.8 | 10.8 | 10.8 | 10.8 | 10.8 | 10.8 | 10.8 | 10.8 |
| Joncryl HPD-96 | | | | | | | | | | | |
| Joncryl 70 | | | | 0.6 | | | | | | | |
| Water | Medium | 19.1 | 3.2 | 20.1 | 32.9 | 32.9 | 32.9 | 32.9 | 32.9 | 32.9 | 32.9 |
| Primal PR-29 | Acrylic silicone resin emulsion | 70.0 | 90.0 | 70.0 | | | | | | | |
| Polysol AP-3900 | | | | | | | | | | | |
| AE980 | | | | | | | | | | | |
| AE982 | | | | | | | | | | | |
| Voncoat AB-901 | Ester acrylate resin emulsion | | | | 20.0 | | | | | | |
| Primal SF-021 | | | | | | 20.0 | | | | | |
| Primal RHA-691 | | | | | | | 20.0 | | | | |
| Polysol AT741 | | | | | | | | 20.0 | | | |
| Polysol AP-3150 | Styrene acrylic resin emulsion | | | | | | | | 20.0 | | |
| Voncoat 3256 | Ester acrylate resin emulsion | | | | | | | | | 20.0 | |
| Nikasol A02K | | | | | | | | | | | 20.0 |
| Muticle PP240D | Resin beads | | | | 4.0 | 4.0 | 4.0 | 4.0 | 4.0 | 4.0 | 4.0 |
| Ropaque Ultra | | | | | 3.0 | 3.0 | 3.0 | 3.0 | 3.0 | 3.0 | 3.0 |
| MOWIPLAS XW330 | Thixotropic | | | | 2.0 | 2.0 | 2.0 | 2.0 | 2.0 | 2.0 | 2.0 |
| Primal ASE-60 | | | | | | | | | | | |
| Primal TT-935 | | 3.0 | | 3.0 | | | | | | | |
| Neocol YSK | Surface active agent | 0.1 | 0.1 | 0.1 | 0.1 | 0.1 | 0.1 | 0.1 | 0.1 | 0.1 | 0.1 |
| Coatcide PH | Anti-corrosive/ anti-fungal agent | 0.1 | 0.1 | 0.1 | 0.1 | 0.1 | 0.1 | 0.1 | 0.1 | 0.1 | 0.1 |
| Proxel XL-2 | | 0.1 | 0.1 | 0.1 | 0.1 | 0.1 | 0.1 | 0.1 | 0.1 | 0.1 | 0.1 |
| Ethylene glycol | Lubricant | 5.0 | 5.0 | 5.2 | 5.0 | 5.0 | 5.0 | 5.0 | 5.0 | 5.0 | 5.0 |
| Propylene glycol | | 0.4 | 0.2 | | | | | | | | |
| Total | | 100.0 | 100.0 | 100.1 | 100.0 | 100.0 | 100.0 | 100.0 | 100.0 | 100.0 | 100.0 |
| Effect | | | | | | | | | | | |
| Water resistance (%) | | 100 | 100 | 100 | 70 | 80 | 0 | 10 | 0 | 0 | 0 |
| Hot water resistance (%) | | 100 | 100 | 100 | 30 | 0 | 100 | 20 | 0 | 100 | 20 |
| Scratch resistance (%) | | 100 | 100 | 100 | 100 | 10 | 10 | 90 | 100 | 70 | 30 |

The solid contents of the emulsions constituting main components of the materials used in the tables above are shown below:

Solid content of Muticle PP240D: 44% (Mitsui Chemicals)

Solid content of Primal PR-29: 43% (MFT 6° C.) (Rohm and Haas)

Solid content of Polysol AP-3900: 50% (MFT 35° C.) (Showa Denko)

Solid content of AE-980: 50% (MFT 0° C. or below) (E-TEC)

Solid content of AE-982: 51% (MFT 10° C.) (E-TEC)

Solid content of Voncoat AB-901: 50% (MFT 0° C. or below) (DIC)

Solid content of Primal SF-021: 45% (MFT 0° C. or below) (Rohm and Haas)

Solid content of Primal RHA-691: 62% (MFT 0° C. or below) (Rohm and Haas)

Solid content of Polysol AT-741: 58% (MFT 0° C. or below) (Showa Denko)

Solid content of Polysol AP-3150: 41% (MFT 0° C. or below) (Showa Denko)

Solid content of Voncoat 3256: 45% (MFT 0° C. or below) (DIC)

Solid content of Nikasol AO2K: 46% (MFT 0° C. or below) (Nippon Carbide)

Based on the results shown in Table 1 above, all of the examples according to the present invention demonstrate good water resistance, hot water resistance, and scratch resistance. In particular, Examples 1, 2, 5, 7, and 11 to 14 show extremely good results of 100% for all evaluation items. In the case of Example 3, where water resistance and hot water resistance are not very good, these results are likely due to the high MFT of Polysol AP-3900 of 35° C. that made it difficult to form coating film compared to when other acrylic silicone resin emulsions were used.

In addition, the slightly lower scratch resistances of Examples 4, 6 and 8 are attributable to the use of AE980 as acrylic silicone resin or the relatively small content of Primal PR-29.

Additionally, the slightly lower scratch resistances of Examples 8 to 10 probably reflect the characteristics of ester acrylate resin emulsion used in combination in the compositions.

On the other hand, Comparative Examples 1 to 7 show that use of other resin emulsions instead of adopting acrylic silicone resin emulsion resulted in an extremely poor result of 30% or below for at least one evaluation item among water resistance, hot water resistance, and scratch resistance.

What is claimed is:

1. A water-based ink composition for glass and ceramic surfaces, containing an acrylic silicone resin emulsion, pigment, dispersant, and water-based solvent, wherein the acrylic silicone resin emulsion is an emulsion of an acrylic silicone resin whose MFT (minimum film-formation temperature) is 30° C. or below.

2. A water-based ink composition for glass and ceramic surfaces according to claim 1, further containing a thixotropic agent and/or resin beads.

* * * * *